United States Patent
Kishine

(10) Patent No.: US 8,508,618 B2
(45) Date of Patent: Aug. 13, 2013

(54) IMAGE PICKUP APPARATUS AND RESTORATION GAIN DATA GENERATION METHOD

(75) Inventor: Yasunobu Kishine, Saitama (JP)

(73) Assignee: Fujifilm Corporation, Tokyo (JP)

( * ) Notice: Subject to any disclaimer, the term of this patent is extended or adjusted under 35 U.S.C. 154(b) by 35 days.

(21) Appl. No.: 13/234,738

(22) Filed: Sep. 16, 2011

(65) Prior Publication Data
US 2012/0069237 A1 Mar. 22, 2012

(30) Foreign Application Priority Data

Sep. 16, 2010 (JP) ................................ 2010-208324

(51) Int. Cl.
*H04N 9/73* (2006.01)
*H04N 5/228* (2006.01)
(52) U.S. Cl.
USPC .................................... 348/224.1; 348/222.1
(58) Field of Classification Search
USPC .......................................... 348/222.1, 224.1
See application file for complete search history.

(56) References Cited

U.S. PATENT DOCUMENTS

| | | | |
|---|---|---|---|
| 5,879,284 A | 3/1999 | Tsujita | |
| 8,194,996 B2* | 6/2012 | Hasegawa | 382/260 |
| 2003/0184663 A1* | 10/2003 | Nakano et al. | 348/241 |
| 2005/0275953 A1* | 12/2005 | George et al. | 359/708 |
| 2008/0007797 A1* | 1/2008 | Hayashi et al. | 358/474 |
| 2008/0250094 A1* | 10/2008 | Chakravarthula et al. | 708/520 |
| 2009/0128666 A1* | 5/2009 | Rappaport et al. | 348/241 |
| 2009/0147111 A1* | 6/2009 | Litvinov et al. | 348/273 |
| 2010/0073518 A1* | 3/2010 | Yeh | 348/231.99 |
| 2010/0157127 A1* | 6/2010 | Takayanagi et al. | 348/333.02 |
| 2011/0149121 A1* | 6/2011 | Ono | 348/242 |

FOREIGN PATENT DOCUMENTS

| | | |
|---|---|---|
| JP | 10-165365 | 6/1998 |
| JP | 2009-089082 | 4/2009 |

OTHER PUBLICATIONS

Song Ho Ahn, "Example of 2D Convolution", 2005, "http://www.songho.ca/dsp/convolution/convolution2d_example.html".*

* cited by examiner

*Primary Examiner* — Roberto Velez
*Assistant Examiner* — Quan Pham
(74) *Attorney, Agent, or Firm* — Young & Thompson

(57) ABSTRACT

An image pickup apparatus according to one aspect of the invention includes: an imaging lens configured to perform a phase modulation function to extend a depth of field; a color image pickup element configured to convert an optical image which passes through the imaging lens and is formed on the image pickup element into an electric signal, the image pickup element having primary filters of three primary colors arranged for respective pixels in a predetermined pattern; and a restoration processing device configured to perform filtering processing using a single restoration filter on color signals corresponding to the primary filters of the three primary colors outputted from the color image pickup element, the restoration filter being an inverse function of a point spread function obtained when the phase modulation is performed by the imaging lens.

10 Claims, 6 Drawing Sheets

| G | B | G | B | G | B | ⋯ odd |
| R | G | R | G | R | G | ⋯ even |
| G | B | G | B | G | B | ⋯ odd |
| R | G | R | G | R | G | ⋯ even |
| G | B | G | B | G | B | ⋯ odd |
| R | G | R | G | R | G | ⋯ even |

| 0 | -0.002 | -0.004 | -0.005 | -0.004 | -0.002 | 0 |
|---|---|---|---|---|---|---|
| -0.001 | -0.001 | -0.004 | 0.029 | -0.004 | -0.001 | -0.001 |
| -0.004 | -0.004 | -0.092 | -0.311 | -0.092 | -0.004 | -0.004 |
| -0.005 | 0.029 | -0.311 | 2.344 | -0.311 | 0.029 | -0.005 |
| -0.004 | -0.004 | -0.092 | -0.311 | -0.092 | -0.004 | -0.004 |
| -0.001 | -0.001 | -0.004 | 0.029 | -0.004 | -0.001 | -0.001 |
| 0 | -0.002 | -0.004 | -0.005 | -0.004 | -0.002 | 0 |

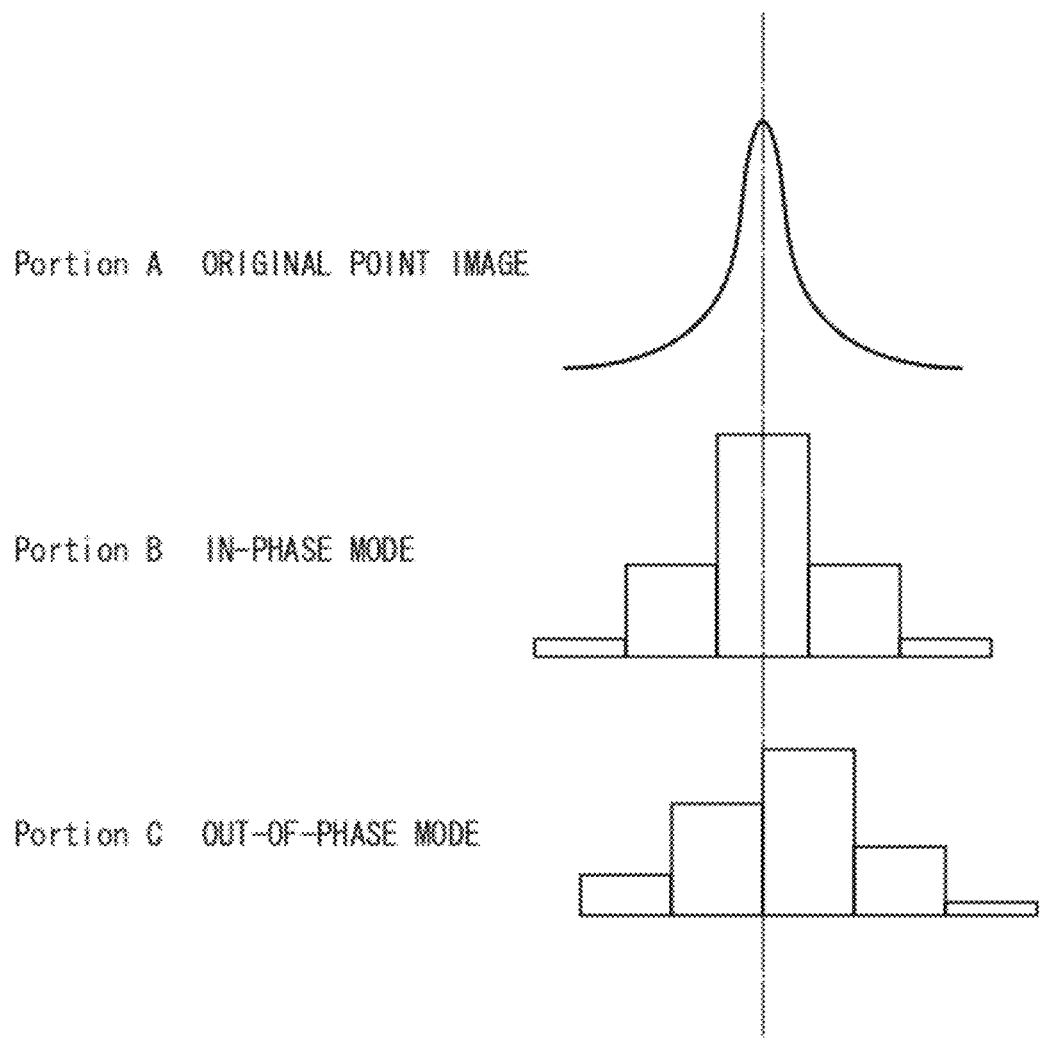

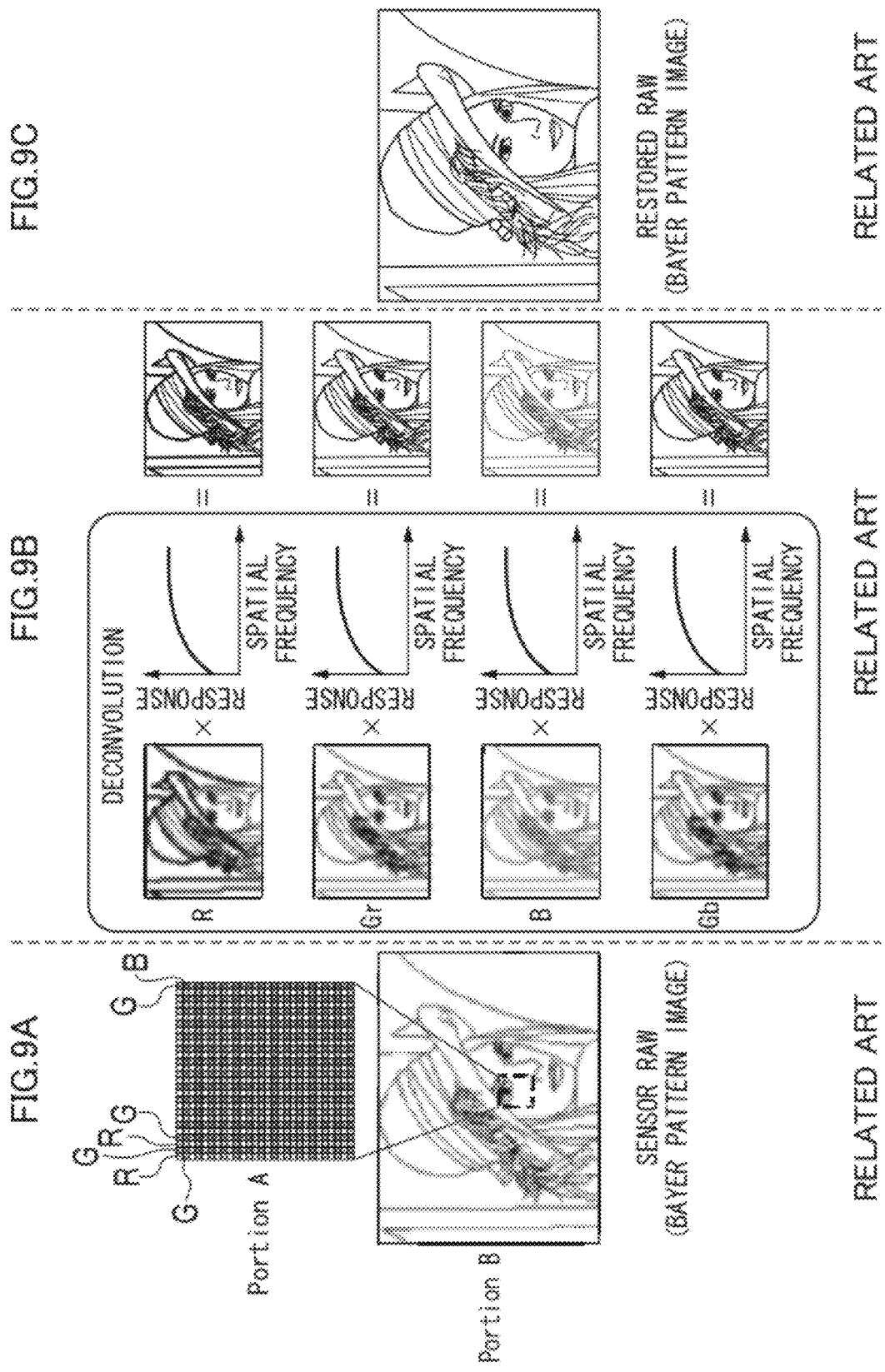

IMAGE PICKUP APPARATUS AND RESTORATION GAIN DATA GENERATION METHOD

BACKGROUND OF THE INVENTION

1. Field of the Invention

The presently disclosed subject matter relates to an image pickup apparatus and a restoration gain data generation method and, more particularly, to a technique for omitting a focusing mechanism for mechanical focusing and obtaining a high-quality image signal.

2. Description of the Related Art

There has been proposed an image restoration apparatus whose imaging optical system has a depth of focus extended by inserting a phase plate (optical wavefront modulation element) for phase modulation in an optical path of the imaging optical system and which restores an image blurred due to the extended depth of focus (a larger point image) to a high-resolution image (a smaller point image) by subjecting the blurred image to filtering processing using a restoration filter (Japanese Patent Application Laid-Open No. 2009-89082).

As illustrated in FIGS. 9A to 9C, the image restoration apparatus described in Japanese Patent Application Laid-Open No. 2009-89082 uses restoration filters prepared for the respective colors of R, Gr, B, and Gb for pieces of RAW data (Portion B of FIG. 9A) of the colors of R (red), G (green), and B (blue) outputted from a color image pickup element (Portion A of FIG. 9A) having color filters arranged in the Bayer pattern to perform filtering processing (deconvolution processing) using one of the restoration filters corresponding to the color of a pixel of interest on a pixel-by-pixel basis (FIG. 9B) and, more particularly, perform restoration processing on pieces of RAW data to be subjected to Bayer pattern interpolation. The image restoration apparatus is configured to reduce the workload by performing restoration processing on one image in the Bayer pattern instead of performing restoration processing on three images of R, G, and B.

SUMMARY OF THE INVENTION

However, since the image restoration apparatus described in Japanese Patent Application Laid-Open No. 2009-89082 performs restoration processing on color signals of R, Gr, B, and Gb outputted from the color image pickup element while switching a restoration filter to be used according to color, color noise is generated. More specifically, use of a different restoration filter for each color leads to use of restoration gain data most suitable for each color and thus allows an improvement in restoration accuracy for each color. However, since deconvolution processing is a process of performing convolution calculation including multiplying a pixel value by a gain (a piece of restoration gain data), use of a different restoration filter (a different piece of restoration gain data) for each color causes generation of color noise.

Additionally, use of a different restoration filter for each color increases the circuit scale and the processing costs.

The presently disclosed subject matter has been made in consideration of the above-described circumstances. An object of the presently disclosed subject matter is to provide an image pickup apparatus and a restoration gain data generation method capable of restoring a high-resolution color image from a color image with an extended depth of focus and, more particularly, of decreasing color noise caused by restoration processing and of achieving a cost reduction associated with a reduction in circuit scale.

In order to achieve the above-described object, an image pickup apparatus according to an aspect of the presently disclosed subject matter includes: an imaging lens configured to perform a phase modulation function to extend a depth of field; a color image pickup element configured to convert an optical image which passes through the imaging lens and is formed on the image pickup element into an electric signal, the image pickup element having primary filters of three primary colors arranged for respective pixels in a predetermined pattern; and a restoration processing device configured to perform filtering processing using a single restoration filter on color signals corresponding to the primary filters of the three primary colors outputted from the color image pickup element, the restoration filter being an inverse function of a point spread function obtained when the phase modulation is performed by the imaging lens.

According to the first aspect, since a single restoration filter is commonly used for color signals of three primary colors, color noise occurring in color image signals having undergone interpolation processing (a process of interpolating a spatial displacement of a color signal associated with the arrangement of primary filters and converting color signals into synchronous ones) subsequent to restoration processing can be reduced. Further, the use of the single restoration filter also achieves a cost reduction associated with a reduction in circuit scale.

Preferably, the restoration processing device performs the filtering processing using the single restoration filter on each color signal within an image pickup screen of color signals of the three primary colors outputted from the color image pickup element, regardless of an image height of each of the color signals. A larger reduction in circuit scale (cost) can be achieved than in a case where a different restoration filter is used for each image height.

Preferably, the restoration processing device includes a storage device configured to store the restoration filter having a piece of restoration gain data corresponding to a predetermined kernel size, and the restoration processing device performs convolution calculation of a color signal at a pixel of interest to be processed and a color signal at a pixel, a color of which is the same as that of the pixel of interest, within a predetermined area centered on the pixel of interest with the piece of restoration gain data of the restoration filter stored in the storage device at the time of restoration processing of color signals at respective pixels outputted from the color image pickup element, and replaces the color signal at the pixel of interest with a value obtained by the convolution calculation.

Preferably, the piece of restoration gain data corresponding to the predetermined kernel size stored in the storage device is rotationally symmetric about a kernel center. With this configuration, uniformity in the resolving power across the entire screen is achieved.

A restoration gain data generation method, according to one aspect of the presently disclosed subject matter, for generating the piece of restoration gain data corresponding to the predetermined kernel size to be stored in the storage device of the image pickup apparatus, includes: a step of picking up a point image by the imaging lens and one of the color image pickup element and a color image pickup element for inspection corresponding to the color image pickup element; a step of calculating a point spread function based on actual measurement values of color signals of one color or a plurality of colors corresponding to primary filters of three primary colors obtained from the color image pickup element; a step of calculating an inverse function of the point spread function based on a mean value of the calculated point spread function corresponding to the one color or the plurality of colors; and a step of generating the piece of restoration gain data corresponding to the calculated inverse function based on the inverse function.

According to the method, a point spread function is calculated based on actual measurement values from one of the imaging lens having a phase modulation function of extending a depth of field and a combination of the imaging lens and the color image pickup element. Intersection can be more sufficiently considered, and a more accurate point spread function can be calculated than a case where a point spread function is calculated from a lens design value. This allows an improvement in image quality. Note that a point spread function may be calculated based on actual measurement values of arbitrary one of three primary colors obtained from the color image pickup element. Also, a mean value of point spread functions for a plurality of colors of the three primary colors may be calculated based on actual measurement values of the plurality of colors.

Preferably, the three primary colors are three primary colors of R (red), G (green), and B (blue), and the actual measurement values are obtained from G pixels corresponding to G primary filters of the color image pickup element.

Since a color signal at a G pixel is close to a luminance signal, use of a single restoration filter allows minimization of a disadvantage (a reduction in resolving power). In addition, in the case of a color image pickup element having R, G, and B color filters arranged in the Bayer pattern, the number of G pixels is larger (twice that of R pixels and that of B pixels), and use of a single restoration filter allows minimization of disadvantages.

Preferably, in the step of picking up the point image, the point image is picked up such that a center of the point image is at a center of an image pickup screen. This makes it possible to achieve a cost reduction while maintaining the image quality at the center of a screen (a point image at the center of the screen is easy to measure).

Preferably, in the step of picking up the point image, the point image is picked up such that a center of the point image is at a 30 percent image height of an image pickup screen. With this configuration, a cost reduction can be achieved while the image quality at a 30 percent image height is maintained. Note that maintenance of the image quality at the 30 percent image height allows maintenance of the image quality within a range extending from the center of the screen to near a 60 percent image height where most of important subjects are present.

Preferably, in the step of picking up the point image, the point image is picked up in an out-of-phase mode in which the center of the point image is off a center of a pixel of the color image pickup element. A higher level of restoration processing is performed than in a case using a restoration filter which is obtained from actual measurement values when a point image is picked up in in-phase mode in which the center of a point image coincides with the center of a pixel of the color image pickup element. This allows an improvement in image quality. Note that since images of fewer subjects are picked up in in-phase mode, restoration processing using pieces of restoration gain data generated on the basis of an in-phase point image (a restoration filter) causes insufficient restoration (edge blurring).

Preferably, in the step of generating the pieces of restoration gain data corresponding to the inverse function, the piece of restoration gain data corresponding to the N×N kernel size is generated such that each piece of restoration gain data is rotationally symmetric about a kernel center. More specifically, if pieces of restoration gain data are generated based on a rotationally asymmetric point image (e.g., an actually measured point image, a point image at a 30 percent image height, or an out-of-phase point image), the pieces of restoration gain data are pieces of rotationally asymmetric restoration gain data, and the resolving power is non-uniform. Accordingly, pieces of restoration gain data are generated (adjusted) to be pieces of rotationally symmetric gain data such that the resolving power is uniform, thereby achieving an improvement in image quality.

According to the presently disclosed subject matter, restoration processing is performed on color signals of three primary colors obtained via an imaging lens having a phase modulation function of extending a depth of field and a color image pickup element by commonly using a single restoration filter. This allows reduction in color noise. Use of a single restoration filter allows achievement of a cost reduction associated with a reduction in circuit scale.

BRIEF DESCRIPTION OF THE DRAWINGS

FIG. 8 is a view including graphs used to explain in-phase mode and out-of-phase mode; and FIGS. 9A to 9C are views used to explain a conventional method for restoring an image blurred due to extension of a depth of focus.

DETAILED DESCRIPTION OF THE PREFERRED EMBODIMENTS

Embodiments of an image pickup apparatus and a restoration gain data generation method according to the presently disclosed subject matter will be described below with reference to the accompanying drawings.

<Image Pickup Apparatus>

Figure 1:
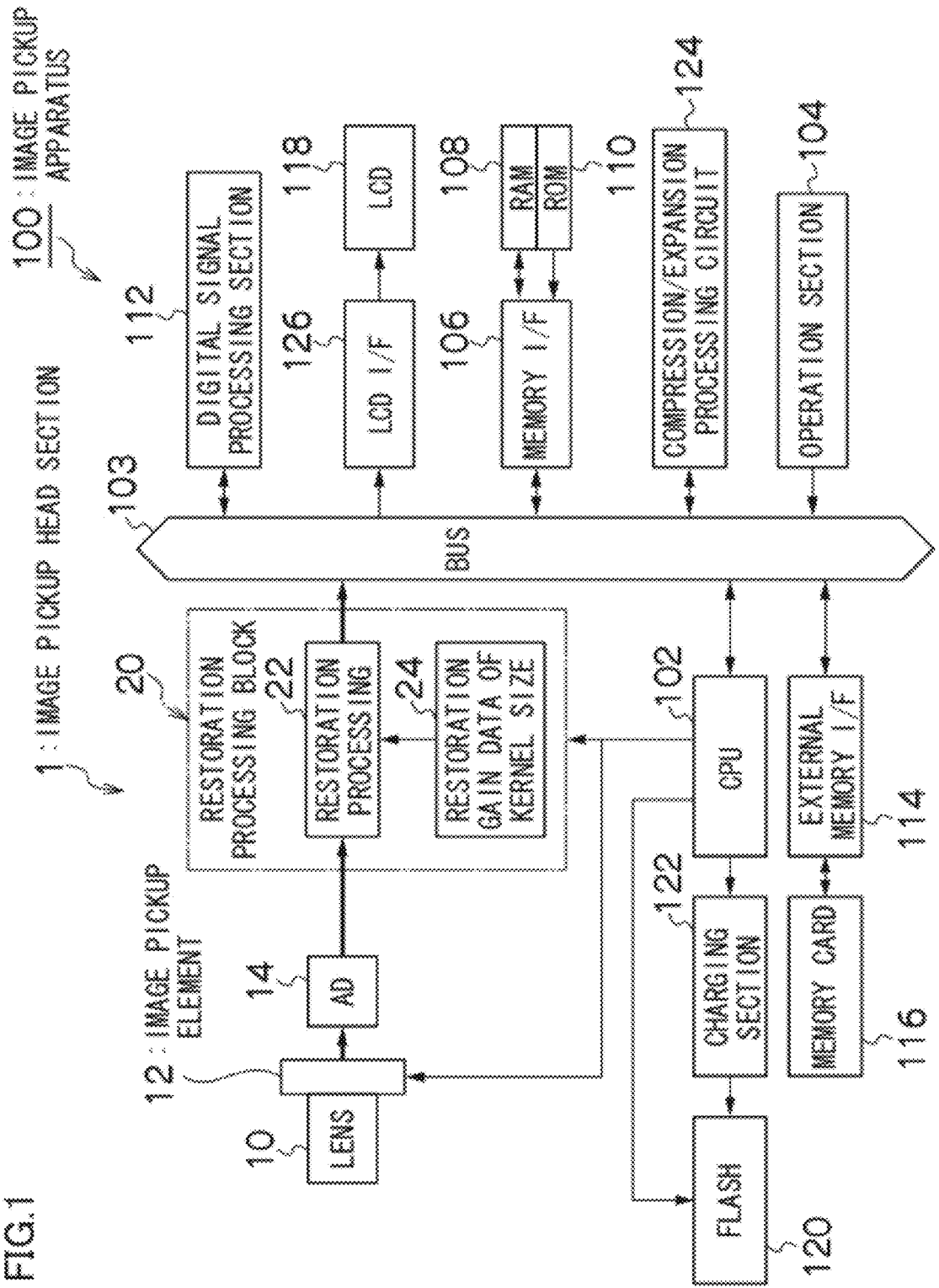
FIG. 1 is a block diagram illustrating an embodiment of an image pickup apparatus according to the presently disclosed subject matter.

FIG. 1 is a block diagram illustrating an embodiment of an image pickup apparatus according to the presently disclosed subject matter.

As illustrated in FIG. 1, an image pickup apparatus 100 includes an image pickup head section 1 which is composed of an imaging lens 10, a color image pickup element 12, an AD conversion (analog-to-digital conversion) section 14, and a restoration processing block 20. The image pickup apparatus 100 has the same configuration as that of a common digital camera except for the image pickup head section 1.

Figures 2, 3:
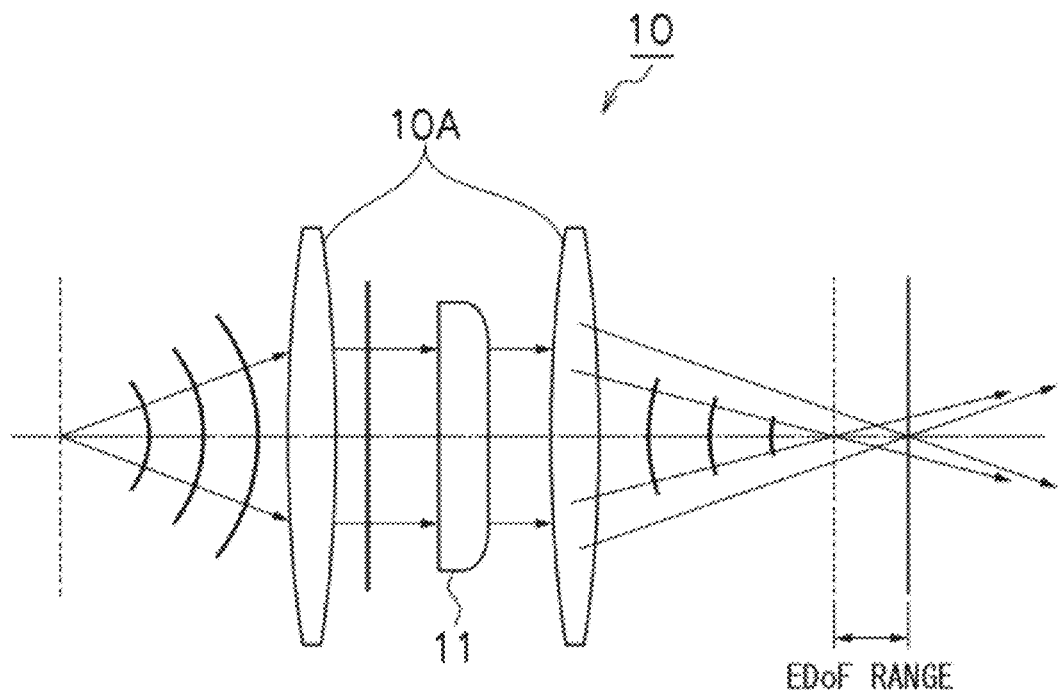
FIG. 2 is a view illustrating an example of an imaging lens having a phase modulation function of extending a depth of field.
FIG. 3 is a view illustrating color filters in the Bayer pattern disposed on a color image pickup element.

FIG. 2 is a view illustrating a configuration of the imaging lens 10. As illustrated in FIG. 2, the imaging lens 10 includes a fixed single-vision lens section 10A and an optical filter 11 which is inserted at a pupil position of the lens section 10A.

The optical filter 11 is intended for phase modulation and causes the lens section 10A to have an extended depth of focus (EDoF).

Note that a diaphragm (not illustrated) is disposed near the optical filter 11. One optical filter 11 may be used or a plurality of optical filters 11 may be used in combination. Alternatively, one or more lenses of the lens section 10A may be provided with the function (phase modulation function) of the optical filter 11, instead of using the optical filter 11.

A focusing mechanism which performs mechanical focusing can be omitted from the imaging lens 10, and the size of the imaging lens 10 can be reduced. The imaging lens 10 is suitable for being mounted on a camera-equipped cellular phone or a personal digital assistant.

An optical image having passed through the EDoF imaging lens 10 is formed at the color image pickup element 12, where the optical image is converted into electric signals.

The color image pickup element 12 is a color image sensor having primary filters of the three primary colors of red (R), green (G), and blue (B) arranged in a predetermined pattern (e.g., the Bayer pattern, the G stripe R/G full-checkered pattern, or the honeycomb pattern) corresponding to respective pixels. The color image pickup element 12 is composed of a CMOS (complementary metal-oxide semiconductor) image sensor or a CCD (charge-coupled device) image sensor.

The color image pickup element 12 according to this embodiment has the color filters arranged in the Bayer pattern, as illustrated in FIG. 3. More specifically, color filters in an odd-numbered row of the color image pickup element 12 are arranged in the order G, B, G, B, G, B . . . . Color filters in an even-numbered row are arranged in the order of R, G, R, G, R, G . . . .

An optical image incident on a light-receiving surface of the color image pickup element 12 via the imaging lens 10 is converted into charge, the amount of which corresponds to the amount of incident light, by photodiodes arranged at the light-receiving surface. Charges accumulated in each photodiode are sequentially outputted as voltage signals (image signals).

The AD conversion section 14 converts an analog image signal outputted from the color image pickup element 12 into a digital image signal. Digital image signals (R, G, and B color signals) obtained by conversion in the AD conversion section 14 are added to the restoration processing block 20.

The restoration processing block 20 includes a restoration processing section 22 and a nonvolatile memory section 24. Filter values for a single restoration filter (pieces of restoration gain data) are stored in the memory section 24.

Figures 4, 5:
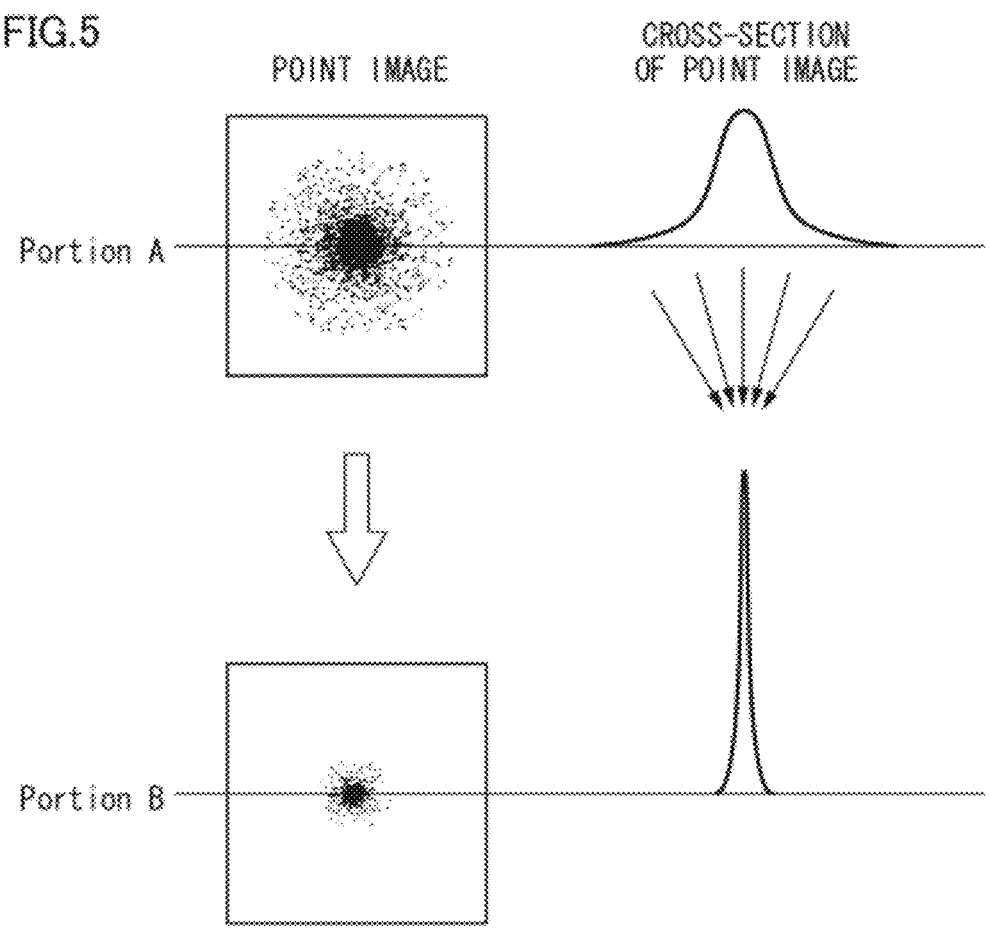
FIG. 4 is a view illustrating an example of 7×7 pieces of restoration gain data of a kernel size stored in a memory section of a restoration processing block.
FIG. 5 is a view illustrating how a point image is restored by deconvolution processing in a restoration processing section.

FIG. 4 is a view illustrating an example of a piece of restoration gain data of a kernel size of 7×7 stored in the memory section 24. The restoration gain data is used for deconvolution processing on phase modulation by the imaging lens 10 (the optical filter 11). A plurality of pieces of restoration gain data are generated for the respective image pickup apparatuses 100 prior to product shipment and are written to the memory sections 24 of the respective image pickup apparatuses 100. The details of a method for generating the pieces of restoration gain data (a restoration gain data generation method according to the presently disclosed subject matter) will be described later.

The restoration processing section 22 performs restoration processing by performing deconvolution processing (convolution calculation) of R, G, and B color signals before restoration processing outputted from the AD conversion section 14, i.e., color signals at 7×7 pixels centered on a pixel of interest and at 7×7 pixels centered on a pixel, the color of which is the same as that of the pixel of interest, in a prescribed area centered on the pixel of interest with a piece of restoration gain data of a kernel size of 7×7 stored in the memory section 24. With this operation, a color signal after the restoration processing is outputted instead of a color signal at the pixel of interest before the processing.

The restoration processing block 20 receives color signals in a manner corresponding to the color filters arranged in the Bayer pattern of the color image pickup element 12, i.e., receives color signals in the order G, B, G, B, G, B . . . when an odd-numbered row is read and receives color signals in the order of R, G, R, G, R, G . . . when an even-numbered row is read. The restoration processing block 20 performs restoration processing using the same piece of restoration gain data stored in the memory section 24, regardless of whether a color signal at a pixel of interest to be processed is an R, G, or B color signal.

As illustrated in FIG. 5 (Portion A), a point image (optical image) having passed through the EDoF imaging lens 10 is formed as a larger point image (blurred image) at the color image pickup element 12. The larger point image is restored to a small point image (high-resolution image) by deconvolution processing in the restoration processing section 22, as illustrated in FIG. 5 (Portion B).

The deconvolution used in the restoration processing is performed by multiplying a pixel value by a gain. Restoration processing using the same piece of restoration gain data for each of R, G, and B color signals allows a reduction in color noise occurring at a pixel after subsequent interpolation processing.

R, G, and B color signals having undergone restoration processing in the above-described manner are outputted as pieces of general RAW data.

A piece of RAW data outputted from the restoration processing block 20 are equivalent to image signals not having passed through the EDoF imaging lens 10 and the restoration processing block 20 (i.e., a piece of RAW data outputted from a common image pickup head section including an imaging lens, a color image pickup element, and an AD conversion section). A signal processing system downstream of the image pickup head section has the same configuration as that of a common digital camera or the like.

A central processing unit (CPU) 102 is a section which controls the entire apparatus in a centralized manner in accordance with an operation input from an operation section 104 and a predetermined program and also functions as a calculation device which performs various calculations such as automatic exposure (AE) calculation and white balance (WB) adjustment calculation.

The CPU 102 is connected to a RAM 108 (Random Access Memory) and a ROM 110 (Read Only Memory) via a bus 103 and a memory interface (memory I/F) 106. The RAM 108 is used as a program expansion area and a calculation work area for the CPU 102 and is also used as an area for temporarily storing image data. The ROM 110 stores programs to be executed by the CPU 102, various types of data required for control, various constants and information associated with image pickup operation.

The image pickup head section 1 performs imaging operation or the like in accordance with a command from the CPU 102 and, as described above, outputs a piece of RAW data for R, G, and B by the restoration processing block 20. The piece of RAW data is temporarily stored in the RAM 108 via the bus 103 and the memory I/F (interface) 106.

The piece of RAW data for R, G, and B stored in the RAM 108 are inputted to a digital signal processing section 112, where the piece of RAW data are subjected to image processes such as noise reduction processing, color mixing correction, shading correction, white balance correction, gamma correction, interpolation processing, and RGB-YC conversion processing.

If RAW data recording is selected, the piece of RAW data described above are recorded in the format of a RAW file on a memory card 116 via an external memory interface (external memory I/F) 114.

The operation section 104 includes a shutter button, a mode selection switch for selecting imaging mode or playback mode, a menu button for displaying a menu screen on a display section (LCD: liquid crystal display) 118, and a multifunction cross key for selecting a desired item on the menu screen. An output signal from the operation section 104 is inputted to the CPU 102 via the bus 103. The CPU 102 performs appropriate processing such as imaging or playback in accordance with an input signal from the operation section 104.

The image pickup apparatus 100 further includes a flash unit 120 for applying (emitting) a flash of light to a subject. The flash unit 120 receives power from a charging section 122 and applies a flash of light, upon receipt of a light emission command from the CPU 102.

The piece of image data (a luminance signal Y and color difference signals Cr and Cb) processed by the digital signal processing section 112 is given to a compression/expansion processing circuit 124, where the piece of image data is compressed in a predetermined compression format (e.g., JPEG (Joint Photographic Experts Group) format). The compressed piece of image data is recorded in the format of an image file (e.g., a JPEG file) on the memory card 116 via the external memory I/F 114.

A picture (live view image) is displayed on the LCD 118 during preparation for image pickup on the basis of image signals added via an LCD interface (LCD I/F) 126. In playback mode, a JPEG file or a RAW file recorded on the memory card 116 is read, and an image is displayed on the LCD 118. Compressed image data stored in a JPEG file is subjected to expansion processing in the compression/expansion processing circuit 124 and is outputted to the LCD 118. RAW data stored in a RAW file is subjected to RAW development in the digital signal processing section 112 and is then outputted to the LCD 118.

An interpolation processing section of the digital signal processing section 112 is a section which generates synchronous R, G, and B color signals from dot sequential R, G, and B color signals at pixels. The interpolation processing section interpolates a spatial displacement of a color signal associated with the arrangement of the primary filters and generates G and B color signals at a position corresponding to an R pixel, R and B color signals at a position corresponding to a G pixel, and R and G color signals at a position corresponding to a B pixel. Since R, G, and B color signals before interpolation processing are obtained by restoration processing using the same restoration filter, color noise occurring in the synchronous R, G, and B color signals thus generated is reduced.

<Restoration Gain Data Generation Method>

A method for generating restoration gain data to be stored in the memory section 24 of the restoration processing block 20 described above will be described.

Figure 6:
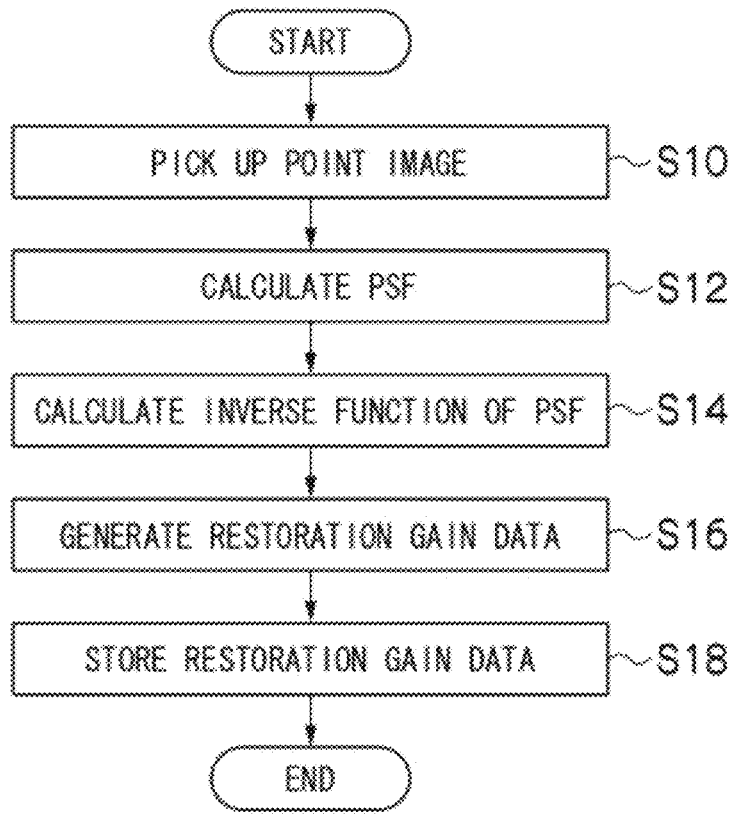
FIG. 6 is a flow chart illustrating an embodiment of a restoration gain data generation method according to the presently disclosed subject matter.

FIG. 6 is a flow chart illustrating an embodiment of a restoration gain data generation method according to the presently disclosed subject matter.

First, at the time of adjustment of an image pickup apparatus 100 (e.g., before shipment of the image pickup apparatus 100), a point image (an image of a point source) is picked up by an imaging lens 10 of the image pickup apparatus 100, and a blurred image with an extended depth of field (a modulated phase) is obtained (step S10), in order to measure a point spread function (PSF) of the imaging lens 10.

At this time, an image pickup element dedicated to measurement may be used or a color image pickup element 12 actually incorporated in the image pickup apparatus 100 may be used. The former case is suitable for measuring a PSF corresponding only to the imaging lens 10. The latter case is suitable for measuring a PSF that takes into account the effects of the color image pickup element 12 (e.g., color filters and the aperture).

Let g(x, y) be an image obtained through pickup of a point image, f(x, y) be an original point image, and h(x, y) be a point spread function (PSF), the blurred image g(x, y) can be represented by the following:

$$g(x,y)=h(x,y)*f(x,y) \qquad \text{[Expression 1]}$$

where * represents a convolution operator.

The function h(x, y) in [Expression 1] (i.e., a point spread function (PSF)) is calculated on the basis of the blurred image g(x, y) obtained through the point image pickup in step S10 (step S12).

The inverse function of the calculated point spread function (PSF) is calculated (step S14). Let R(x, y) be the inverse function, a restored image corresponding to the original image f(x, y) is obtained by convoluting the phase-modulated image g(x, y) with R(x, y), as given by the following:

$$g(x,y)*R(x,y)=f(x,y). \qquad \text{[Expression 2]}$$

The function R(x, y) will be referred to as a restoration filter. A restoration filter is composed of 7×7 filter values (a piece of restoration gain data), as illustrated in FIG. 4. In step S16, a piece of restoration gain data is generated. Note that a least squares filter (Wiener filter) which minimizes the mean square error of an original image and a restored image, a limited deconvolution filter, a recursive filter, a homomorphic filter, or the like can be used as a restoration filter of this type. Restoration processing is described in, e.g., IEICE Transactions, Vol. J67-D, No. 10, November 1984 and 0 plus E, Extra Issue, November 1986 (see paragraphs [0023] and [0024] of Japanese Patent Application No. 8-329549 (Japanese Patent Application Laid-Open No. 10-165365)).

The piece of restoration gain data generated in step S16 is stored in a memory section 24 in a restoration processing block 20 (step S18).

The piece of restoration gain data generated and stored in the memory section 24 in the above-described manner is used for restoration processing of all R, G, and B color signals, regardless of an image height in a screen. Only one piece (set) of restoration gain data is prepared.

[Measurement of PSF Corresponding to G Pixel]

When the piece of restoration gain data is to be generated, a point image is picked up such that the center of the point image coincides with a G pixel of the color image pickup element, a color signal at the G pixel and color signals at G pixels within a predetermined area centered on the G pixel are obtained, and a PSF is measured.

In the color image pickup element 12 having color filters arranged in the Bayer pattern, the number of G pixels is twice that of R pixels and that of B pixels, and a color signal at a G pixel is close to a luminance signal. Accordingly, use of the piece of restoration gain data generated on the basis of color signals at G pixels for restoration processing of color signals at R pixels and B pixels causes only a minimum disadvantage (a reduction in resolving power).

[Measurement of PSF on Axis]

When a point image is to be picked up such that the center of the point image coincides with a G pixel of the color image pickup element, a point image is picked up such that the center coincides with the center of a screen of the color image pickup element (on a light axis of the imaging lens 10) or a G pixel closest to the center of the screen, and a PSF is measured.

This optimizes restoration of an image at the center of the screen. Additionally, since a point image at the center of the screen is easy to measure, a cost reduction can be achieved.

[Measurement of PSF at 30 Percent Image Height of Screen]

Figure 7:
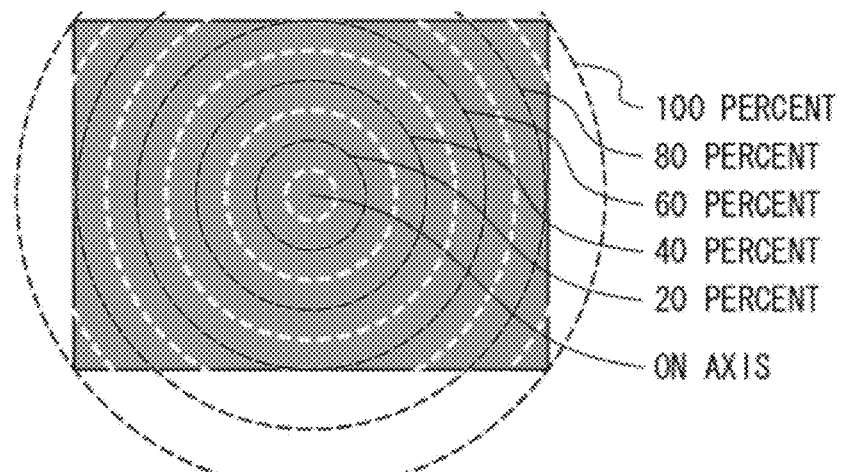
FIG. 7 is a view illustrating the relationship between a screen and an image height.

FIG. 7 is a view illustrating the relationship between a screen and an image height. In the above embodiment, PSF measurement is performed on an axis. In another embodiment, a point image is picked up such that the center of the point image is at a 30 percent image height of an image pickup screen, and a PSF is measured.

This optimizes restoration of an image at the 30 percent image height of the screen. Additionally, maintenance of the image quality at the 30 percent image height allows maintenance of the image quality within a range extending from the center of the screen to near a 60 percent image height where most of important subjects are present.

[Pickup of Point Image in Out-of-Phase Mode]

When a point image is to be picked up such that the center of the point image coincides with a G pixel of a color image pickup element, a point image is picked up such that the center is off the center of a G pixel, and a PSF is measured.

As illustrated in FIG. 8 (Portion A), an original point image is obtained as discrete image signals according to the intervals among pixels (G pixels) of the color image pickup element. There are two cases: a case where a point image is picked up such that the center of the original image coincides with the center of a G pixel (the point image is picked up in in-phase mode), as illustrated in FIG. 8 (Portion B), and a case where a point image is picked up such that the center of the original image is off the center of a G pixel (the point image is picked up in out-of-phase mode), as illustrated in FIG. 8 (Portion C).

In this embodiment, a point image is picked up in out-of-phase mode in which the center of an original point image is off the center of a G pixel of the color image pickup element.

According to this embodiment, a higher level of restoration processing is performed than in a case using a restoration filter which is obtained from actual measurement values when a point image is picked up in in-phase mode in which the center of an original point image coincides with the center of a pixel of the color image pickup element. The image quality can be improved. Since images of fewer subjects are picked up in the in-phase mode (in terms of probability), restoration processing using the piece of restoration gain data generated on the basis of an in-phase point image (a restoration filter) causes insufficient restoration (edge blurring). In contrast, image pickup in out-of-phase mode allows resolution of the problem.

The example of image pickup in out-of-phase mode illustrated in FIG. 8 (Portion C) illustrates a case where the center of the original point image is farthest off the center of a pixel of the color image pickup element. Image pickup is preferably performed such that the center of the original point image is off the center of a pixel of the color image pickup element by an amount intermediate between that of the in-phase mode case illustrated in FIG. 8B and that of the out-of-phase mode case illustrated in FIG. 8 (Portion C) (this preferable case is also an out-of-phase mode case).

[Rotational Symmetrization]

When the piece of restoration gain data is to be generated in step S16 in FIG. 6, the piece of restoration gain data calculated from an inverse function of a PSF is adjusted such that each piece of restoration gain data is rotationally symmetric about a kernel center, as illustrated in FIG. 4.

A point image actually measured via an actually used imaging lens 10, a point image at a 30 percent image height, and an out-of-phase point image are rotationally asymmetric point images. The piece of restoration gain data generated on the basis of a PSF of such a rotationally asymmetric point image is a piece of rotationally asymmetric restoration gain data, and the resolving power is non-uniform.

Accordingly, in this embodiment, a piece of restoration gain data is generated (adjusted) to be a piece of rotationally symmetric gain data such that the resolving power within a screen is uniform, thereby achieving an improvement in image quality. PSFs of four point images at 30 percent image height at positions vertically symmetric and horizontally symmetric with respect to the center of an image pickup screen are measured, and the mean of the PSFs is calculated, thereby calculating a nearly rotationally symmetric PSF. The piece of restoration gain data generated on the basis of the calculated PSF is further adjusted to generate a piece of rotationally symmetric restoration gain data.

In the case of a piece of rotationally symmetric restoration gain data, the amount of data to be stored in a memory section 24 can be reduced. For example, in the case of a 7×7 kernel illustrated in FIG. 4, 4×4 pieces of restoration gain data may be stored. Use of the symmetry of the 4×4 pieces of restoration gain data allows generation of 7×7 pieces of restoration gain data.

[Others]

In this embodiment, a PSF is measured on the basis of a point image obtained from G pixels of a color image pickup element. The presently disclosed subject matter, however, is not limited to this. The mean value (e.g., the weighted mean) of PSFs measured on the basis of point images obtained from R, G, and B pixels may be calculated. Color filters of a color image pickup element are not limited to those arranged in the Bayer pattern. Color filters arranged in any other pattern such as the G stripe R/G full-checkered pattern or the honeycomb pattern may be used.

Moreover, the presently disclosed subject matter is not limited to the above-described embodiments. It is, of course, understood that various modifications may be made without departing from the spirit of the presently disclosed subject matter.

What is claimed is:

1. A restoration gain data generation method for generating a piece of restoration gain data corresponding to a predetermined kernel size to be stored in a storage device of an image pickup apparatus, comprising the steps of:

providing an image pickup apparatus that includes an imaging lens configured to perform a phase modulation function to extend a depth of field, a color image pickup element configured to convert an optical image which passes through the imaging lens and is formed on the image pickup element into an electric signal, the image pickup element having primary filters of three primary colors arranged for respective pixels in a predetermined pattern, and a restoration processing device configured to perform filtering processing using a single restoration filter on color signals corresponding to the primary filters of the three primary colors outputted from the color image pickup element, the restoration filter being an inverse function of a point spread function obtained when the phase modulation is performed by the imaging lens, the restoration processing device including a storage device configured to store the restoration filter having a piece of restoration gain data corresponding to a predetermined kernel size, and the restoration processing device configured to perform a convolution calculation of a color signal at a pixel of interest to be processed and a color signal at a pixel having a same color as that of the pixel of interest, within a predetermined area centered on the pixel of interest with the piece of restoration gain data stored in the storage device at the time of restoration processing of color signals at respective pixels outputted from the color image pickup element, and to replace the color signal at the pixel of interest with a value obtained by the convolution calculation, the piece of restoration gain data corresponding to the predetermined kernel size stored in the storage device being rotationally symmetric about a kernel center;

picking up a point image by the imaging lens and one of the color image pickup element and a color image pickup element for inspection corresponding to the color image pickup element;

calculating a point spread function based on actual measurement values of color signals of one color or a plurality of colors corresponding to primary filters of three primary colors obtained from the color image pickup element;

calculating an inverse function of the point spread function based on a mean value of the calculated point spread function corresponding to the one color or the plurality of colors; and generating the piece of restoration gain data corresponding to the calculated inverse function based on the inverse function, wherein, in the step of picking up the point image, the point image is picked up such that a center of the point image is at a 30 percent image height of an image pickup screen.

2. The restoration gain data generation method according to claim 1, wherein the restoration processing device of the provided image pickup apparatus performs the filtering processing using the single restoration filter on each color signal within an image pickup screen of color signals of the three primary colors outputted from the color image pickup element, regardless of an image height of each of the color signals.

3. The restoration gain data generation method according to claim 1, wherein the three primary colors are three primary colors of R (red), G (green), and B (blue), and the actual measurement values are obtained from G pixels corresponding to G primary filters of the color image pickup element.

4. The restoration gain data generation method according to claim 1, wherein, in the step of picking up the point image, the point image is picked up such that a center of the point image is at a center of an image pickup screen.

5. The restoration gain data generation method according to claim 1, wherein, in the step of generating the piece of restoration gain data corresponding to the calculated inverse function, the piece of restoration gain data corresponding to an N×N kernel size is generated such that each piece of restoration gain data is rotationally symmetric about the kernel center.

6. A restoration gain data generation method for generating a piece of restoration gain data corresponding to a predetermined kernel size to be stored in a storage device of an image pickup apparatus, comprising the steps of:

providing an image pickup apparatus that includes an imaging lens configured to perform a phase modulation function to extend a depth of field, a color image pickup element configured to convert an optical image which passes through the imaging lens and is formed on the image pickup element into an electric signal, the image pickup element having primary filters of three primary colors arranged for respective pixels in a predetermined pattern, and a restoration processing device configured to perform filtering processing using a single restoration filter on color signals corresponding to the primary filters of the three primary colors outputted from the color image pickup element, the restoration filter being an inverse function of a point spread function obtained when the phase modulation is performed by the imaging lens, the restoration processing device including a storage device configured to store the restoration filter having a piece of restoration gain data corresponding to a predetermined kernel size, and the restoration processing device configured to perform a convolution calculation of a color signal at a pixel of interest to be processed and a color signal at a pixel having a same color as that of the pixel of interest, within a predetermined area centered on the pixel of interest with the piece of restoration gain data stored in the storage device at the time of restoration processing of color signals at respective pixels outputted from the color image pickup element, and to replace the color signal at the pixel of interest with a value obtained by the convolution calculation, the piece of restoration gain data corresponding to the predetermined kernel size stored in the storage device being rotationally symmetric about a kernel center;

picking up a point image by the imaging lens and one of the color image pickup element and a color image pickup element for inspection corresponding to the color image pickup element;

calculating a point spread function based on actual measurement values of color signals of one color or a plurality of colors corresponding to primary filters of three primary colors obtained from the color image pickup element;

calculating an inverse function of the point spread function based on a mean value of the calculated point spread function corresponding to the one color or the plurality of colors; and generating the piece of restoration gain data corresponding to the calculated inverse function based on the inverse function, wherein, in the step of picking up the point image, the point image is picked up in an out-of-phase mode in which the center of the point image is off a center of a pixel of the color image pickup element.

7. The restoration gain data generation method according to claim 6, wherein the restoration processing device of the provided image pickup apparatus performs the filtering processing using the single restoration filter on each color signal within an image pickup screen of color signals of the three primary colors outputted from the color image pickup element, regardless of an image height of each of the color signals.

8. The restoration gain data generation method according to claim 6, wherein
   the three primary colors are three primary colors of R (red), G (green), and B (blue), and
   the actual measurement values are obtained from G pixels corresponding to G primary filters of the color image pickup element.

9. The restoration gain data generation method according to claim 6,
   wherein, in the step of picking up the point image, the point image is picked up such that a center of the point image is at a center of an image pickup screen.

10. The restoration gain data generation method according to claim 6,
    wherein, in the step of generating the piece of restoration gain data corresponding to the calculated inverse function, the piece of restoration gain data corresponding to an N×N kernel size is generated such that each piece of restoration gain data is rotationally symmetric about the kernel center.

* * * * *